United States Patent
Laskowski et al.

(10) Patent No.: US 6,925,232 B2
(45) Date of Patent: Aug. 2, 2005

(54) HIGH SPEED THERMO-OPTIC PHASE SHIFTER AND DEVICES COMPRISING SAME

(75) Inventors: Edward John Laskowski, Short Hills, NJ (US); Christi Kay Madsen, South Plainfield, NJ (US); Annjoe Golangco Wong-Foy, Basking Ridge, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 31 days.

(21) Appl. No.: 10/448,711

(22) Filed: May 30, 2003

(65) Prior Publication Data

US 2004/0240818 A1 Dec. 2, 2004

(51) Int. Cl.⁷ .............................. G02B 6/26; G02B 6/10
(52) U.S. Cl. ........................................ 385/39; 385/129
(58) Field of Search ................................ 385/3, 15, 16, 385/39–40, 43, 50, 129–132, 123, 126

(56) References Cited

U.S. PATENT DOCUMENTS

| | | | | |
|---|---|---|---|---|
| 6,122,416 A | * | 9/2000 | Ooba et al. ..................... | 385/16 |
| 6,310,999 B1 | * | 10/2001 | Marcuse et al. ............... | 385/42 |
| 6,535,672 B1 | * | 3/2003 | Paiam .......................... | 385/50 |
| 6,643,419 B2 | * | 11/2003 | Chang et al. .................. | 385/14 |
| 6,704,487 B2 | * | 3/2004 | Parhami et al. ............. | 385/129 |
| 6,751,396 B2 | * | 6/2004 | Erben .......................... | 385/141 |
| 2002/0146226 A1 | * | 10/2002 | Davis et al. ................. | 385/126 |

* cited by examiner

Primary Examiner—Frank G. Font
Assistant Examiner—Christopher M. Kalivoda

(57) ABSTRACT

In accordance with the invention, a high speed thermo-optic phase shifter comprises a length of optical waveguide including a waveguiding core of a first material having an index of refraction $n_1$ and a first order temperature dependence $|dn_1/dT|$ and, optically coupled to the core, a length of a second material having an index $n_2$ preferably greater than the core ($n_2 > n_1$) and a first order temperature dependence $|dn_2/dT|$ than the core ($|dn_2/dT| > |dn_1/dT|$). Advantageously, the length of second material is adiabatically tapered at both ends. Upon heating, as by a resistance heater, the second material changes the optical pathlength by an amount predominantly determined by $|dn_2/dT|$ providing faster switching speed. In a preferred embodiment, the core comprises silica, and the second material comprises silicon to produce switching speeds up to a few hundred MHz.

20 Claims, 4 Drawing Sheets

HIGH SPEED THERMO-OPTIC PHASE SHIFTER AND DEVICES COMPRISING SAME

FIELD OF THE INVENTION

This invention relates to devices for processing optical signals and, in particular, to a high speed thermo-optic phase shifter for controllably changing the optical path length for light passing through the shifter and thus the phase of the light.

BACKGROUND

Thermo-optic phase-shifting devices are essential components of optical communication systems. By thermally changing the refractive index of material in an optical pathway, they can control switching, attenuation or modulation of an optical signal. The principle of operation is that by heating a waveguide, the lightwave in the waveguide can be delayed enough to cause a change from constructive to destructive interference (or vice versa) with an undelayed lightwave, resulting in switching.

A typical thermo-optic phase shifter comprises a resistance heater thermally coupled to the high index core of a silica waveguide. Heat changes the temperature of the core and thereby the refractive index since it is temperature dependent. This changes the integrated product of index and distance (optical pathlength) and hence changes the time required for the passage of the light.

While such phase shifters are simple to fabricate and operate, they are unfortunately slow and consume too much power for many applications. Typically their switching frequencies are limited to a few kHz and they consume about 50–350 mW of electrical power. Phase shifters that could provide faster switching at comparable or lower power would be highly desirable.

SUMMARY OF THE INVENTION

In accordance with the invention, a high speed thermo-optic phase shifter comprises a length of optical waveguide including a waveguiding core of a first material having an index of refraction $n_1$ and a first order temperature dependence $|dn_1/dT|$ and, optically coupled to the core, a length of a second material having an index $n_2$ preferably greater than the core ($n_2 > n_1$) and a first order temperature dependence $|dn_2/dT|$ greater than the core ($|dn_2/dT| > |dn_1/dT|$). Advantageously, the length of second material is shaped at each end for adiabatically coupling to the waveguiding core. Upon heating, as by a resistance heater, the second material changes the optical pathlength by an amount predominantly determined by $|dn_2/dT|$, thus providing faster switching speed. In a preferred embodiment, the core comprises silica, and the second material comprises silicon to produce switching speeds up to a few hundred MHz.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1A:
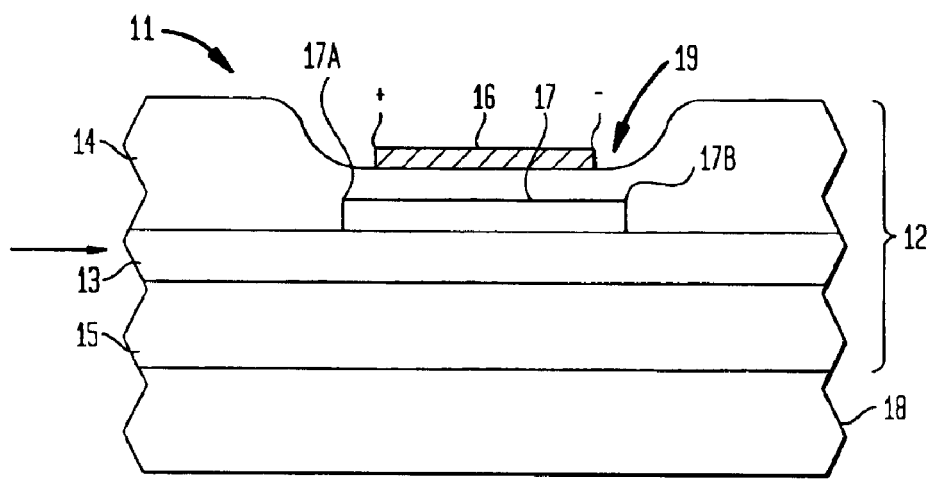
FIGS. 1A, 1B, 1C and 1D are schematic side, top and transverse cross sectional views of a high-speed thermo-optic phase shifter in accordance with the invention.

Referring to the drawings, FIG. 1A is a schematic side view of a thermo-optic phase shifter 11 comprising an optical waveguide structure 12 composed of a waveguiding core 13 and upper and lower cladding layers 14, 15. The core 13 is composed of a material having an index of refraction $n_1$ greater than the index of refraction of the cladding layers 14, 15. Typically the index of refraction of the core will also exhibit a temperature dependence $|dn_1/dT|$. A heater 16, which can be a length of resistive metal, is thermally coupled to the core, as through upper cladding layer 14.

In accordance with the invention, a secondary core 17 having an index $n_2$ with a greater temperature dependence than the core ($|dn_2/dT| > |dn_1/dT|$) is both optically coupled to the core and thermally coupled to the heater 16. In practice, the secondary core 17 is closely spaced along a length of core 13 along a region thermally coupled to the heater. Closely spaced, in this context, means that the secondary core is within the exponential intensity tail of light transmitted in core 13. The index of the secondary core 17 is greater than the index of the cladding and advantageously greater than the index of core 13 ($n_2 > n_1$).

Figure 1B:
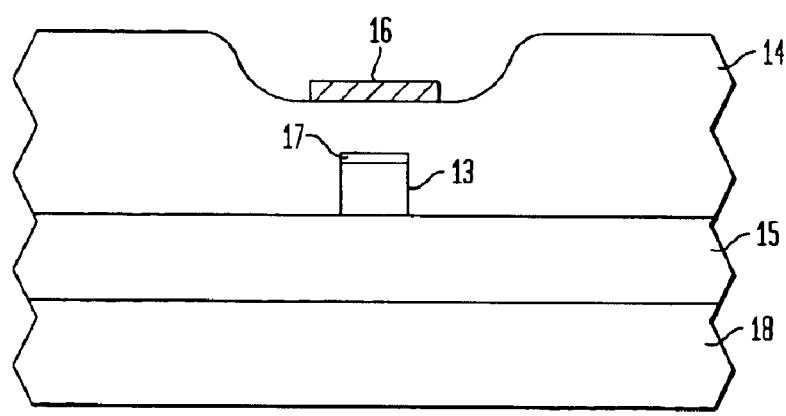

In an advantageous embodiment, the waveguide is a planar waveguide overlying a supporting substrate 18. A local trench 19 is advantageously formed in upper cladding 15, as by etching, to bring the heater 16 closer to the core 13 for thermal efficiency and speed. The high index secondary core provides sufficient optical mode confinement that the upper cladding thickness in the trench can be reduced as low as about two micrometers. The secondary core 17 preferably intervenes in the thermal path between the heater and the core 13. FIG. 1B schematically illustrates the device in transverse cross section.

Figure 1C:
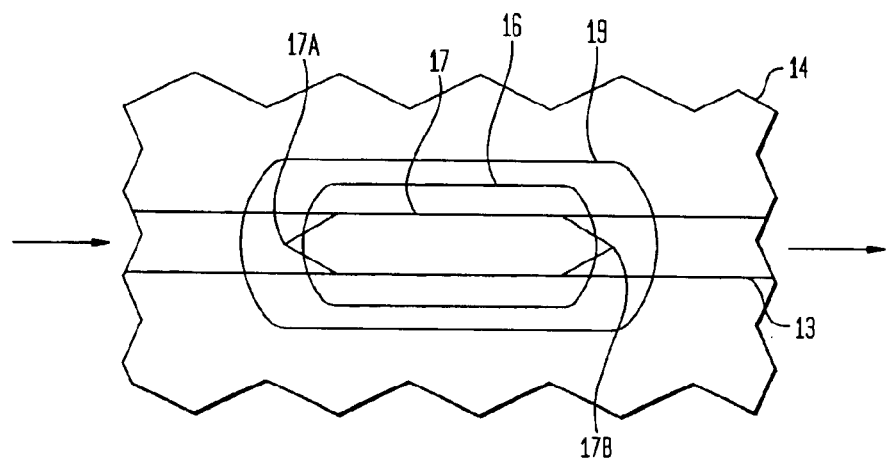

As can be better seen from the top view of FIG. 1C, the secondary core 17 is of limited length, roughly co-extensive with the heater 16 whose length, in turn, is chosen to produce a desired phase shift. The ends 17A and 17B of secondary core 17 are advantageously shaped, as by tapering, to adiabatically couple to core 13. Light traveling along core 13 is gradually coupled into core 17 at one end e.g. 17A, without significant loss due to non-guided modes and similarly coupled back into core 13 at the other end 17B. This adiabatic coupling avoids the need for complex mode converters.

Figure 1D:
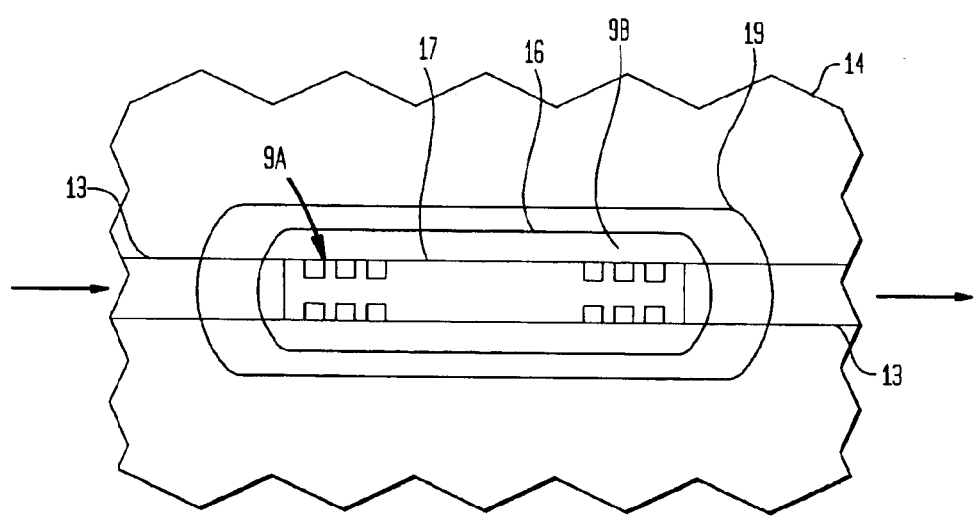

In an advantageous embodiment, the substrate 18 can be a silicon wafer, the core 13 can be silica doped to increase its refractive index and the cladding layers 14, 15 can be silica or air. The secondary core 17 can be polysilicon. For adiabatic low-loss coupling to a standard—Δ waveguide, it is important to taper the ends 9A, 9B to a very fine dimension (e.g. on the order of 60 nm at the tips). Alternatively, long period gratings 19 can be etched in the ends of the secondary core as shown in FIG. 1D (top view). Choice of the grating period permits excitation of a particular mode of the silicon waveguide.

The device can be made using a modified form of the silicon optical bench process described by C. H. Henry et al. in "Glass Waveguides on Silicon for Hybrid Optical Packaging," 7 *J. Lightwave Technol.*, pp. 1530–39 (1989). In essence a silicon substrate is provided with a base layer of SiO$_2$, and thin core layers of doped silica glass and polysilicon are deposited on the oxide. The polysilicon is configured to form secondary core 17 (with tapered or grating ends), and the underlying doped silica is configured to form core 13, all using standard photolithographic techniques. A layer of doped silica glass is deposited on the core to act as upper cladding 14. The upper cladding can be optionally trenched to receive the heater 16, and the heater can be deposited as by sputtering or vacuum evaporation and can be patterned by photolithography. In typical applications, the core 13 has a thickness of a few micrometers. The secondary core 17 has a thickness of a few tenths of a micrometer and a length of a few centimeters.

In operation, light traveling along core 13 begins coupling into secondary core 17 at upstream end 17A. Coupling is facilitated by the secondary core 17 having a higher refractive index than core 13, and low-loss coupling is obtained by the tapered or grating formation of end 17A. A controlled phase shift (delay) is introduced by the application of heat from heater 16. The heat changes the index of the temperature sensitive secondary core 17 more rapidly than the core 13 (Recall that $|dn_2/dT|>|dn_1/dT|$). Polysilicon, for example, produces about 20 times more phase delay per degree of temperature rise than a standard silica core. After incurring the delay along core 17, at downstream end 17B the delayed light couples back into core 13. The result is phase shifting at a high speed as compared to standard silica cores.

For a π phase change in silica, a temperature change of about 77.5 degrees Celsius is required; however, for a silicon or polysilicon waveguide with almost 100% mode confinement in the core, a change of only about 4.2 degrees is needed.

Figure 2A:
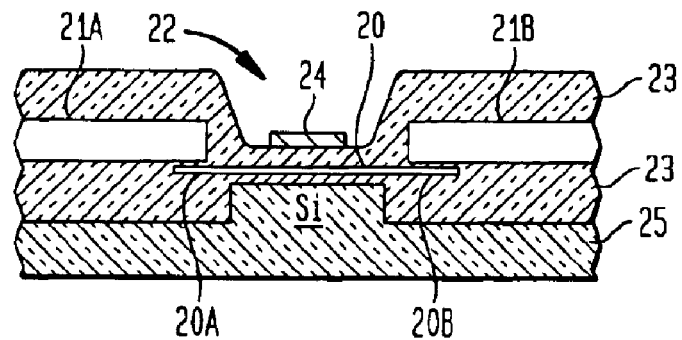
FIGS. 2A, 2B, 2C and 2D illustrate alternative forms of the phase shifter.

FIG. 2A illustrates a longitudinal cross section of an alternative embodiment of a phase shifter in accordance with the invention wherein a silicon or polysilicon waveguide 20 optically couples light between segments 21A and 21B of conventional silica waveguide. Long period gratings or adiabatic tapers at the ends 20A, 20B are used to couple the silicon waveguide with the lower-index-contrast conventional waveguide. A locally etched trough 22 in the cladding 23 can bring the heating electrode 24 close to or actually on the silicon core. Because the evanescent (exponential) tail of the lower-contrast waveguides 21A, 21B will extend into the cladding 23, the substrate 25 is advantageously recessed under the segments 21A, 21B and under the overlap regions 20A, 20B. In general, the thinner the silica between the electrode and the silicon core, the faster the response of the phase shifter. This structure can be readily fabricated using the well known SOI (silicon-oxide-insulator) fabrication process.

Figure 2B:
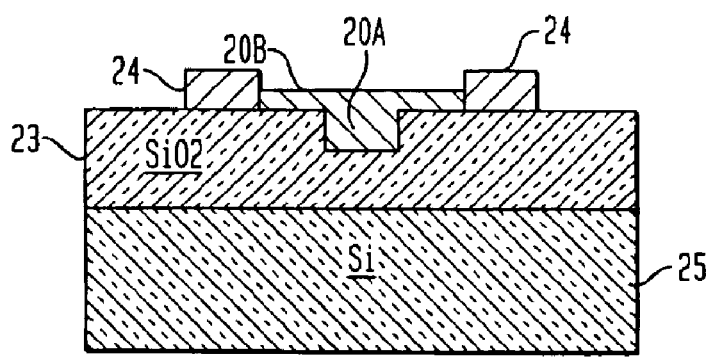

An advantageous variation of the FIG. 2A phase shifter uses a rib waveguide to transmit heat from an electrode removed from the waveguiding region. FIG. 2B is a transverse cross section of a phase shifter similar to that shown in FIG. 2A except that the polysilicon waveguide 20 is disposed overlying the cladding 23, has a thickened rib 20A and has one or more laterally extending flanges 20B. The thickened rib 20A is the guiding region, and rib 20A is heated by one or more heating electrodes 24 removed from the waveguiding rib 20A but thermally coupled to the rib by flanges 20B. The advantages of the embodiment include 1) fast coupling of heat through silicon rather than cladding and 2) positioning of the heating electrodes on the flanges 20B removed from the optical guiding region 20A. Metal near the waveguiding region would produce unwanted loss. In addition the disposition of the waveguide 20 on the surface permits rapid cooling when the heating power is reduced which, in turn, enhances speed of response. The cladding can be silica, silicon nitride for high speed, or even air by bridging the rib across an air gap.

To roughly quantify the improved performance obtainable, applicants calculated the response time for a π-phase shift for a conventional device and the FIG. 1 device. Two-dimensional calculations were performed using ICEPAK software. Simulations predict a response time as low as 3.3 ns at a steady state power of 3.6 mW for a π phase shift or, with air cladding, a slower response time of 15 ns but only 0.26 mW for a π phase shift.

Figure 2C:
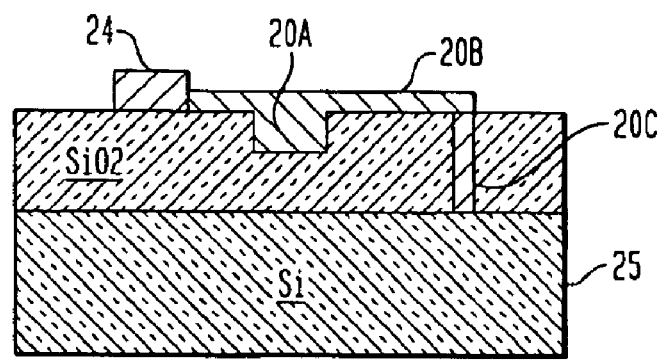
Figure 2D:
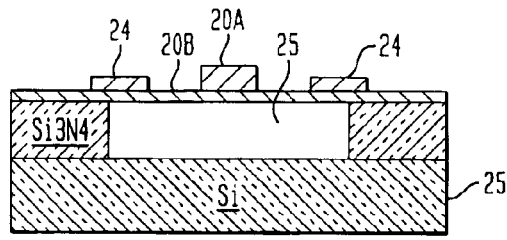

FIG. 2C is similar to the phase shifter of FIG. 2B except that one flange 20B is thermally coupled to a heat sink as by a fin 20C connected to substrate 25. Heat from electrode 24 heats rib 20A. When the heating power is reduced, the heat rapidly couples from the rib through the flange and fin (preferably polysilicon) to the heat sinking substrate 25 (preferably silicon).

Figure 3:
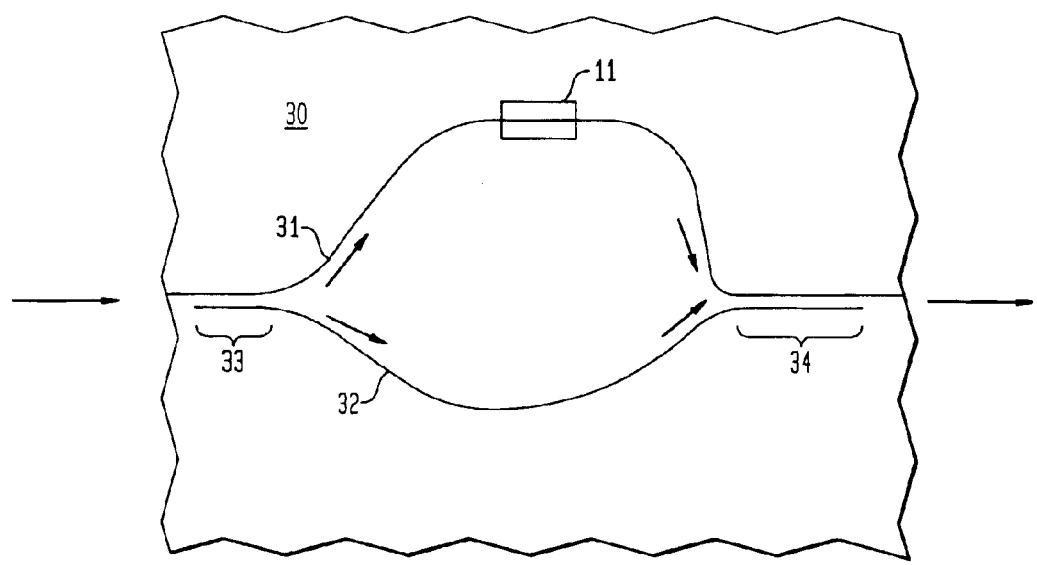
FIG. 3 is a schematic top view of a switch or modulator employing the phase shifter of FIG. 1 or FIG. 2.

FIG. 3 illustrates a thermo-optical switch or modulator 30 employing one or more high-speed thermo-optic phase shifters 11 according to FIG. 1 or FIG. 2. The switch 30 comprises a pair of optical waveguides 31, 32 interacting via couplers 33, 34 (typically 3 dB couplers or beam splitters and recombiners). The coupler 33 splits input light to the two waveguides, and coupler 34 recombines the light from the two waveguides. In essence, the waveguides and couplers form a Mach-Zehnder interferometer.

At least one of the waveguide "arms", here upper waveguide 31, includes a thermo-optic phase shifter 11 for controllably changing the optical pathlength through the arm as compared to the pathlength through the other arm 32.

In operation, after the light beam is split at input coupler 33, the light is recombined at output coupler 34. The light will recombine by constructive interference if it recombines in phase. It will recombine by destructive interference if it recombines with a π phase difference. Phase shifter 11 can control this phase difference and thus determine whether the output light intensity is minimally reduced, essentially zero or modulated to some intermediate level.

It can now be seen that, in one aspect, the invention is a thermo-optic phase shifting device for thermally changing the phase shifting device for thermally changing the phase of light traveling therethrough. The device comprises an optical waveguiding structure comprising a first waveguiding core, a second waveguiding core, and a cladding peripherally surrounding the first and second cores. The first core has an index of refraction $n_1$ with a temperature dependence $|dn_1/dT|$. The second core has a length less than the length of the first core, a pair of ends, an index of refraction $n_2>n_1$ and a temperature dependence $|dn_2/dT|>|dn_1/dT|$. The second core is optically coupled to the first core so that light traveling along the first core is coupled into the second core beginning at one of the ends and from the second core to the first core at the other end. A heater is thermally coupled to the second core between the ends to thermally change the index of refraction along the second core. Thus light entering through the first core is coupled into the second core, thermally shifted in phase, and coupled back into the first core.

In another aspect, the invention is a thermo-optic switch or modulator. It comprises a pair of optical waveguides interacting by a pair of optical couplers so that a light beam on one of the waveguides is split to both the waveguides by the first coupler and recombined at the second coupler. At least one of the waveguides includes a thermo-optic switch as described above by which the phase difference between the beams is controlled to control the output light intensity.

It is understood that the above-described embodiments are illustrative of only a few of the many possible specific embodiments, which can represent applications of the invention. Numerous and varied other arrangements can be made by those skilled in the art without departing from the spirit and scope of the invention.

What is claimed is:

1. A thermo-optic phase shifting device for thermally changing the phase of light traveling therethrough comprising:

an optical waveguiding structure comprising a first waveguiding core, a second waveguiding core and a cladding peripherally surrounding the first core and at least partially surrounding the second core;

the first core having an index of refraction $n_1$ with a temperature dependence $|dn_1/dT|$;

the second core having a length less than the length of the first core and a pair of ends, the second core having an index of refraction $n_2$ with a temperature dependence $|dn_2/dT|$, $n_2$ being greater than $n_1$ and $|dn_2/dT|$ being greater than $|dn_1/dT|$;

the second core optically coupled to the first core such that light traveling along the first core is coupled into the second core beginning at one of the ends and the light is coupled from the second core to the first core at the other of the ends; and a heater thermally coupled to the second core between the ends for thermally changing the index of refraction along the second core.

2. The phase shifting device of claim 1 wherein the ends of the second core are structured for respectively adiabatically coupling light from and back into the first core.

3. The phase shifting device of claim 1 wherein the waveguiding structure comprises a substrate, a first layer of cladding overlying the substrate, the first and second cores disposed in light coupling proximity, and a second layer of cladding overlying the cores.

4. The phase shifting device of claim 3 wherein the first core comprises silica and the second core comprises polysilicon.

5. The phase shifting device of claim 3 wherein the layer of cladding overlying the cores comprises a trench overlying the cores and the heater is disposed in the trench.

6. The phase shifting device of claim 1 wherein the cladding comprises silica, silicon nitride or air.

7. The phase shifting device of claim 1 wherein the second core is disposed on the surface of the cladding.

8. The phase shifting device of claim 1 wherein the second core in transverse cross section comprises a waveguiding thickened rib region and at least one laterally extending thinner flange region.

9. The phase shifting device of claim 8 wherein the least one laterally extending flange contacts the heater and transmits heat to the rib region.

10. The phase shifting device of claim 8 further comprising a heat sink wherein at least one laterally extending flange contacts the heat sink and transmits heat from the rib to the heat sink.

11. A thermo-optic switch or modulator comprising;

a pair of optical waveguides interacting by a pair of optical couplers such that a light beam on one of the waveguides is split to both of the waveguides by the first coupler and recombined at the second coupler, wherein at least one of the waveguides includes a thermo-optic phase shifting device according to claim 1.

12. A thermo-optic switch or modulator comprising;

a pair of optical waveguides interacting by a pair of optical couplers whereby a light beam on one of the waveguides is split to both of the waveguides by the first coupler and recombined at the second coupler, wherein at least one of the waveguides includes a thermo-optic phase shifting device according to claim 2.

13. A thermo-optic switch or modulator comprising:

a pair of optical waveguides interacting by a pair of optical couplers whereby a light beam on one of the waveguides is split to both of the waveguides by the first coupler and recombined at the second coupler, wherein at least on of the waveguides includes a thermo-optic phase shifting device according to claim 3.

14. A thermo-optic switch or modulator comprising:

a pair of optical waveguides interacting by a pair of optical couplers whereby a light beam on one of the waveguides is split to both of the waveguides by the first coupler and recombined at the second coupler, wherein at least one of the waveguides includes a thermo-optic phase shifting device according to claim 4.

15. A thermo-optic switch or modulator comprising:

a pair of optical waveguides interacting by a pair of optical couplers whereby a light beam on one of the waveguides is split to both of the waveguides by the first coupler and recombined at the second coupler, wherein at least one of the waveguides includes a thermo-optic phase shifting device according to claim 5.

16. A thermo-optic switch or modulator comprising:

a pair of optical waveguides interacting by a pair of optical couplers whereby a light beam on one of the waveguides is split to both of the waveguides by the first coupler and recombined at the second coupler, wherein at least one of the waveguides includes a thermo-optic phase shifting device according to claim 6.

17. A thermo-optic switch or modulator comprising:

a pair of optical waveguides interacting by a pair of optical couplers whereby a light beam on one of the waveguides is split to both of the waveguides by the first coupler and recombined at the second coupler, wherein at least one of the waveguides includes a thermo-optic phase shifting device according to claim 7.

18. A thermo-optic switch or modulator comprising:

a pair of optical waveguides interacting by a pair of optical couplers whereby a light beam on one of the waveguides is split to both of the waveguides by the first coupler and recombined at the second coupler, wherein at least one of the waveguides includes a thermo-optic phase shifting device according to claim 8.

19. A thermo-optic switch or modulator comprising:

a pair of optical waveguides interacting by a pair of optical couplers whereby a light beam on one of the waveguides is split to both of the waveguides by the first coupler and recombined at the second coupler, wherein at least one of the waveguides includes a thermo-optic phase shifting device according to claim 9.

20. A thermo-optic switch or modulator comprising:

a pair of optical waveguides interacting by a pair of optical couplers whereby a light beam on one of the waveguides is split to both of the waveguides by the first coupler and recombined at the second coupler, wherein at least one of the waveguides includes a thermo-optic phase shifting device according to claim 10.

* * * * *